(12) United States Patent
Wang et al.

(10) Patent No.: US 9,069,397 B2
(45) Date of Patent: Jun. 30, 2015

(54) TIMING CONTROLLER AND LIQUID CRYSTAL DISPLAY COMPRISING THE TIMING CONTROLLER

(75) Inventors: Xin Wang, Beijing (CN); Haifeng Liu, Beijing (CN); Ning Zhao, Beijing (CN)

(73) Assignees: Analogix (China) Semiconductor, Inc., Beijing (CN); Analogix International LLC, New Castle, DE (US)

( * ) Notice: Subject to any disclaimer, the term of this patent is extended or adjusted under 35 U.S.C. 154(b) by 0 days.

(21) Appl. No.: 13/503,744

(22) PCT Filed: Aug. 16, 2011

(86) PCT No.: PCT/CN2011/078490
§ 371 (c)(1),
(2), (4) Date: Apr. 24, 2012

(87) PCT Pub. No.: WO2012/155401
PCT Pub. Date: Nov. 22, 2012

(65) Prior Publication Data
US 2014/0071115 A1 Mar. 13, 2014

(30) Foreign Application Priority Data
May 19, 2011 (CN) .......................... 2011 1 0131088

(51) Int. Cl.
*G06F 1/04* (2006.01)
*G09G 3/36* (2006.01)
(Continued)

(52) U.S. Cl.
CPC .. *G06F 1/04* (2013.01); *G09G 3/20* (2013.01); *G09G 5/18* (2013.01); *G09G 2310/08* (2013.01);
(Continued)

(58) Field of Classification Search
CPC ............. G09G 3/36; G09G 5/00; G09G 5/08; G09G 3/20; G09G 5/18; G09G 2310/08; G09G 3/3611; G09G 2310/027; G09G 2330/06; G09G 2370/08; G06F 1/04

USPC ............................................ 345/99, 100, 214
See application file for complete search history.

(56) References Cited

U.S. PATENT DOCUMENTS 6,020,901 A    2/2000  Lavelle et al.
8,330,699 B2 * 12/2012  Hong et al. ..................... 345/99
(Continued)

FOREIGN PATENT DOCUMENTS

CN    101273394 A    9/2008
CN    101399027 A    4/2009
(Continued)

OTHER PUBLICATIONS

Office Action issued Apr. 1, 2013 in CN Application No. 201110131088.7.
(Continued)

*Primary Examiner* — Lun-Yi Lao
*Assistant Examiner* — Johny Lau
(74) *Attorney, Agent, or Firm* — Panitch Schwarze Belisario & Nadel LLP

(57) ABSTRACT

The present invention discloses a timing controller and a liquid crystal display comprising the same, wherein, the timing controller comprises a data converting module (10) for converting inputted serial video stream data into parallel video stream data, and a memory (30) for storing the parallel video stream data, and also comprises an output module (50) connected with the memory (30) for generating a predetermined clock signal and outputting the parallel video stream data under the control of the predetermined clock signal. With the technical solution of the present invention, the problem in the prior art is solved that the rate of the outputted video stream data is affected by the input. In addition, as the outputted video stream data is controlled by the clock signal it generates, this solves the problem of long locking duration of the timing controller in the prior art.

9 Claims, 2 Drawing Sheets

(51) Int. Cl.
*G09G 5/00* (2006.01)
*G06F 3/033* (2013.01)
*G09G 3/20* (2006.01)
*G09G 5/18* (2006.01)

(52) U.S. Cl.
CPC ........ *G09G 3/3611* (2013.01); *G09G 2310/027* (2013.01); *G09G 2330/06* (2013.01); *G09G 2370/08* (2013.01)

(56) References Cited

U.S. PATENT DOCUMENTS

2008/0007508 A1* 1/2008 Yoneyama .................... 345/100
2008/0246755 A1* 10/2008 Lee .............................. 345/214

FOREIGN PATENT DOCUMENTS

| | | |
|---|---|---|
| CN | 101477779 A | 7/2009 |
| JP | H05-73004 A | 3/1993 |
| JP | H10-319928 A | 12/1998 |
| JP | H11-272549 A | 10/1999 |
| JP | 2003-330427 A | 11/2003 |
| JP | 2005-538397 A | 12/2005 |
| JP | 2010-134162 A | 6/2010 |
| JP | 2010-170144 A | 8/2010 |
| KR | 100256502 B1 | 5/2000 |

OTHER PUBLICATIONS

Int'l Search Report and Written Opinion issued Dec. 8, 2011 in Int'l Application No. PCT/CN2011/078490.

* cited by examiner

TIMING CONTROLLER AND LIQUID CRYSTAL DISPLAY COMPRISING THE TIMING CONTROLLER

CROSS-REFERENCE TO RELATED APPLICATIONS

This application is a Section 371 of International Application No. PCT/CN2011/078490, filed Aug. 16, 2011, which has not yet been published by the International Bureau, and the disclosure of which is incorporated herein by reference.

BACKGROUND OF THE INVENTION

The present invention relates to the field of liquid crystal display, in particular, to a timing controller and a liquid crystal display comprising the timing controller.

The timing controller (TCON) is a chip in the liquid crystal display (LCD) module, and is used to receive video stream data from a video signal processing device (such as a multi-media processor or an image processor), conduct serial processing on the video stream data and form a drive signal which drives multiple source driver integrated circuits, so that the source driver integrated circuits form different data voltages to drive the display flat panel to display different images.

FIG. 1 is a schematic view of the structure of a liquid crystal display screen in the prior art. As shown in FIG. 1, the timing controller (TCON) is connected with multiple source drive integrated circuits (SDIC). From the structure of the liquid crystal display screen shown in FIG. 1, no any clock transmission line is separately provided in the display screen. That is to say, the timing controller (TCON) in the prior art transmits video stream data and clock signals via a data transmission line.

The data transmission manner of not separately providing a clock transmission line in the prior art achieves more convenient data transmission within the LCD display screen. However, this data transmission design in the prior art requires transmitting clock information via a data channel, which requires that the source drive integrated circuit (IC) should contain a clock-data recovery (CDR) module therein.

In usual circumstances, a Phase Locked Loop (PLL) or a Delay Locked Loop (DLL) is used to implement the clock-data recovery module. Usually, the recovery time (i.e. the locked time) of the clock signal of each PLL or DLL will be recovered in 100 us or longer (which is related to the bandwidth of the PLL or DLL). Thus, compared with the transmission line dedicated for transmitting clock information, using the PLL or DLL to recover the clock signal would require relatively long time, so as to achieve a stable state of the transmission of the clock signal.

Also, if the different display manners of the display screens during practical use are taken into consideration, using the PLL or DLL to recover the clock signal would also require different periods of time. For example, in an sDDRS mode among the display manners of the display screens, as the energy consumption of the display screens is lowered in a manner of reducing update rate, when the clock signal frequencies of the display screens change, the transmission interface between the timing controller and the source drive IC will require a longer locking period of time. In addition, when the display modes of the display screens change, the locking period of time of the timing controller also gets longer. For example, when the display screens transform from a normal display mode to a fail safe mode, the locking period of time will also increase.

FIG. 2 is a schematic view of the structure of the timing controller in the prior art. As shown in FIG. 2, receiving the video stream is realized via the LVDS interface (in specific circuits it may be other interface standards). The video clock signal in the LVDS interface serves as a reference clock of MPLL to generate multiple clocks of different phases. The multiple clocks of multiple phases have two purposes: one is to serve as a high speed sampling clock of the interface to receive the high speed serial video signal of the interface part using an over sampling principle, and the other is to use the clocks of multiple phases as a modulation source of a spread spectrum clock signal. The data part subjected to correct sampling will be stored in a memory, and is usually the effective video data of one video row or multiple video rows. Using the memory to store video data in the timer mainly aims to use the memory to convert data from the video clock domain as received to a clock domain desired by a sending format, and use the memory to convert the data format from a row format as received to a specific format compatible with a drive chip. The clock sign subjected to distributed spectrum clock with spread spectrum via the DSP's modulating and choosing and the DPLL's filtering. The spread spectrum clock subjected to frequency change via a final TXPLL generates a rate desired by the sending format and has a spread spectrum characteristic to drive the final data sending.

As discussed above, to support a distributed spectrum desired by display screens, usually three Locked Loops are required in current timing controllers to generate distributed clock signals, as the reference clocks of all the Locked Loops come from inputted clocks, when inputted clock frequency changes, all Locked Loops need to relock new frequencies. Hence, this structure leads to a long locking period of time of the overall system.

Meanwhile, from the structure of the timing controller shown in FIG. 2, the reference clock signal inputted via the input end of the phase locked loop MPLL is a pixel clock signal sent by a video signal processing device (for example, a media processor or image processor) via a differential signal input unit (the LVDS RX shown in FIG. 2), and the rate at which the timing controller outputs the video stream data will be controlled by the pixel clock signal inputted via the input end of the locked loop MPLL. Different frequency values of the pixel clock signal will result in different locking periods of time of the locked loop within the timing controller, and will also result in change of the bit rate at which the timing control outputs data within the conversion period for outputting the video stream data. Particularly, when the frequency of the reference clock frequency changes or the display mode of the display screen changes, as the locked loop needs to relock at a new frequency, it will take a relatively long period of time to relock the timing controller and the source drive integrated circuit connected with the timing controller so as to adapt to the new frequency, which will prolong the stabilization time of the video stream data during transmission.

To sum up, the locking period of time of the timing controller is long and the rate at which the timing controller outputs the video stream data is affected by input, which are the main disadvantages of the timing controller in a clock-free transmission line in the prior art, and will to a certain extent restrict the use of the timing controller of the clock-free transmission line in the prior art.

BRIEF SUMMARY OF THE INVENTION

The present invention aims to provide a timing controller and a liquid crystal display comprising it, to solve the problems in the prior art that the locking period of time of the timing controller is long and the rate at which the timing controller outputs the video stream data is affected by input.

To achieve the above purpose, according to one aspect of the present invention, a timing controller is provided, comprising: a data converting module for converting inputted serial video stream data into parallel video stream data; and a memory for storing the parallel video stream data; and further comprising: an output module connected with the memory for generating a predetermined clock signal and outputting the parallel video stream data under the control of the predetermined clock signal.

Moreover, the output module comprises: a clock signal frequency providing circuit which provides a frequency value of the predetermined clock signal; a first locked loop connected with the clock signal providing circuit for generating the predetermined clock signal according to the frequency value of the predetermined clock signal; and a differential output unit connected with the memory and the first locked loop for outputting a differential output signal comprising the parallel video stream data under the control of the predetermined clock signal.

Moreover, the first phase locked loop is also connected to the memory at its output end which provides the predetermined clock signal to the memory.

Moreover, the clock signal frequency providing circuit comprises: a reference frequency providing unit connected with the first locked loop and providing a reference clock signal frequency value to the first locked loop; and a frequency generating unit connected with the first locked loop and providing the frequency value of the predetermined clock signal.

Moreover, the frequency value tx_clk of the predetermined clock signal is calculated according to a formula: tx_clk=k*osc_clk, wherein, k is a predetermined proportional coefficient value, and osc_clk is the reference clock signal frequency value.

Moreover, the data converting module comprises: a differential signal input unit receiving inputted pixel clock signals; and a second locked loop connected with the differential signal input unit at its input end for receiving the pixel clock signals and forming a multiphase clock signal which is sent to the clock signal input end of the differential signal input unit, wherein, the differential signal input unit is also used to receive the serial video stream data and form the parallel video stream data based on the multiphase clock signal and send it to the memory.

Moreover, the differential signal input unit is also used to send the multiphase clock signal to the memory.

According to another aspect of the present invention, a liquid crystal display is provided comprising the above timing controller.

By way of the technical solution of the present invention, the parallel video stream data outputted by the timing controller is controlled by the clock signal it generates, that is, the output frequency of the timing controller is controlled by the clock signal it generates, which thus solves the problem in the prior art that the rate at which the timing controller outputs the video stream data is affected by input. Also, as the outputted video stream data is controlled by the clock signal it generates, no matter how the input clock frequency changes, the output frequency is constant, the structure of the timing controller in this embodiment would also reduce the locking period of time of the timing controller to a certain extent, thereby solving the problem of long locking period of time of the timing controller in the prior art.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The embodiments of the present invention will be detailed hereinafter in conjunction with the accompanying drawings. However, the present invention can be implemented via multiple embodiments defined and covered by the claims.

Figure 3:
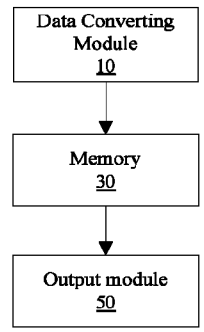
FIG. 3 is a schematic view of the principle of the timing controller according to embodiment 1 of the present invention.

FIG. 3 is a schematic view of the principle of the timing controller according to embodiment 1 of the present invention. As shown in FIG. 3, the timing controller comprises a data converting module 10, a memory 30 and an output module 50.

Wherein, the data converting module 10 is used to convert inputted serial video stream data into parallel video stream data; the memory 30 connected with the data converting module 10 is used to store the parallel video stream data; the output module 50 connected with the memory 30 is used to generate a predetermined clock signal and output the parallel video stream data under the control of the predetermined clock signal.

Figure 1:
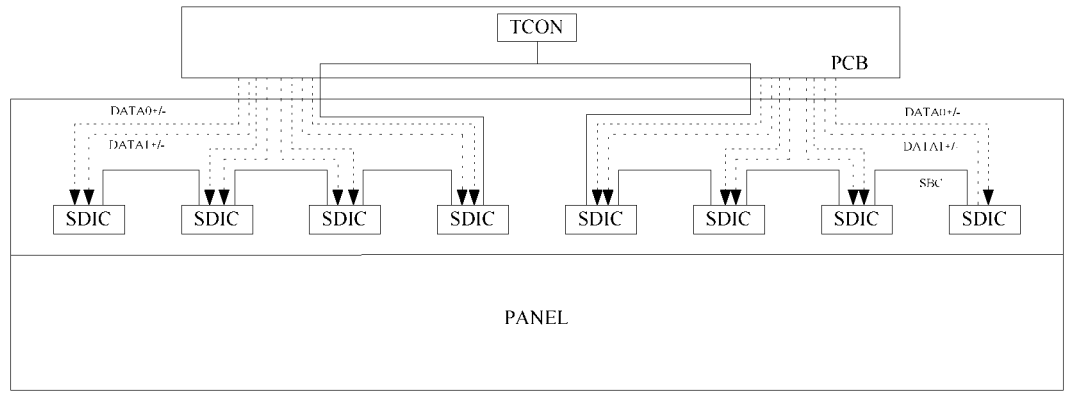
FIG. 1 is a schematic view of the structure of the liquid crystal display screen in the prior art.
Figure 2:
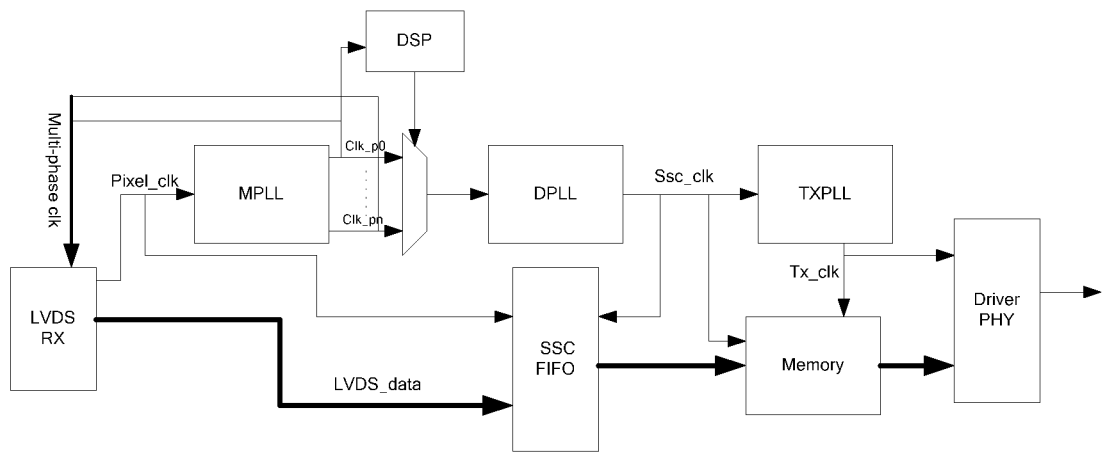
FIG. 2 is a schematic view of the structure of the timing controller in the prior art.

Moreover, in this embodiment, the data converting module 10 can also be realized using the locked loop MPLL shown in FIG. 2, and the memory 30 can also have the structure of the memory shown in FIG. 2. That is, the data converting module 10 and the memory 30 can both be realized using devices having the same functions in the prior art.

From the structure of the timing controller shown in FIG. 3, the parallel video stream data outputted by the timing controller is controlled by the clock signal it generates, that is, the output frequency of the timing controller is controlled by the clock signal it generates, which thus solves the problem in the prior art that the rate at which the timing controller outputs the video stream data is affected by input. Also, as the outputted video stream data is controlled by the clock signal it generates, no matter how the input clock frequency changes, the output frequency is constant, the structure of the timing controller in this embodiment would also reduce the locking period of time of the timing controller to a certain extent, thereby solving the problem of long locking period of time of the timing controller in the prior art.

Figure 4:
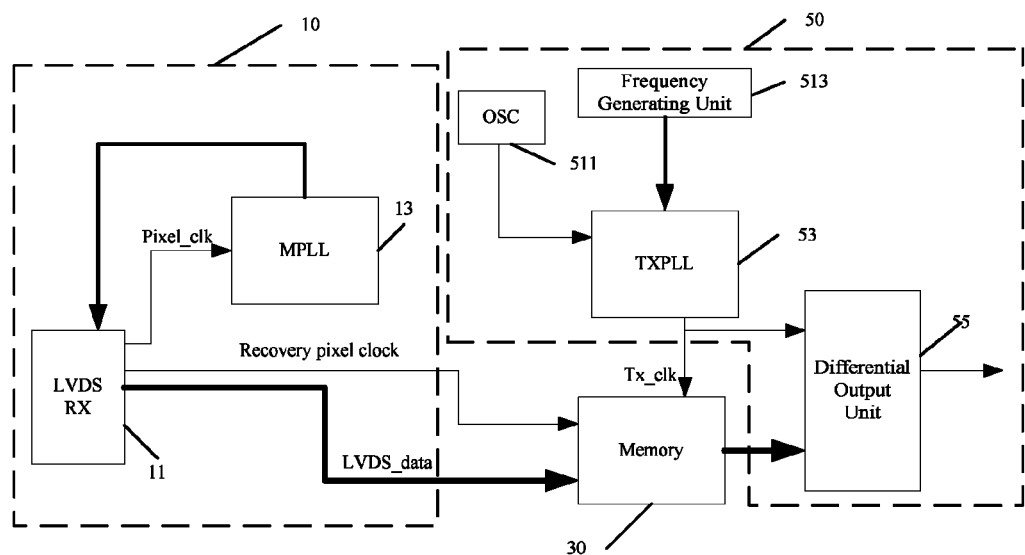
FIG. 4 is a schematic view of the principle of the timing controller according to embodiment 2 of the present invention.

FIG. 4 is a schematic view of the principle of the timing controller according to embodiment 2 of the present invention. As shown in FIG. 4, the output module 50 comprises: a clock signal frequency providing circuit which provides a frequency value of the predetermined clock signal, as the reference input clock of a first locked loop 53; the first locked loop 53 connected with the clock signal providing circuit for generating a desired output drive clock having a spread spectrum characteristic according to the frequency value of the predetermined clock signal; and a differential output unit 55 connected with the memory 30 and the first locked loop 53 for reading and finishing the video stream data under the control of the predetermined clock signal by an output specific format and finally driving the video stream data as a differential signal for output, so as to transmit the video data to the liquid crystal drive chip.

Specifically, from the structure of the timing controller shown in FIG. 4, the clock signal frequency providing circuit comprises a reference frequency providing unit 511 and a frequency generating unit 513. Wherein, the reference frequency providing unit 511, i.e., the oscillator (OSC) shown in FIG. 4, is connected with the first locked loop 53 and provides the frequency value of the reference clock signal to the first locked loop 53, that is, it provides a local clock signal OSC to the locked loop TXPLL as shown in FIG. 4; the frequency generating unit 513 is connected with the first locked loop 53 and provides the frequency value of the predetermined clock signal to the locked loop TXPPL as shown in FIG. 4.

Wherein, in the frequency generating unit 513, the frequency value tx_clk of the predetermined clock signal is calculated according to a formula: tx_clk=k*osc_clk, wherein, k is a predetermined proportional coefficient value, and osc_clk is the reference clock signal frequency value.

That is, in this embodiment, using the local clock signal generated by the output module 50 itself as the reference clock signal of its internal phase locked loop makes the reference clock signal of the phase locked loop in the output module 50 constant, that is, even the timing controller does not have the pixel clock signal at its input end or the work mode of the display screen changes, the phase locked loop in the output module 50 will work normally at a constant frequency. Wherein, the frequency value tx_clk of the predetermined clock signal is calculated via the equation of tx_clk=k*osc_clk.

If a frequency value calculating module for calculating the frequency value is used to generate the frequency value tx_clk of the predetermined clock signal, as the frequency value calculating module is usually realized with a data processing chip, while the data processing chip for calculating the frequency value could hardly accurately express a non-integer, the equation tx_clk=k*osc_clk is changed to tx_clk=M/N*osc_clk, wherein M and N are both positive integers, that is, the predetermined coefficient value in the equation tx_clk=k*osc_clk is obtained via the division of two positive integers.

Also, in this embodiment, the data converting module 10 comprises: a differential signal input unit 11 receiving inputted pixel clock signals; and a second locked loop 13 connected with the differential signal input unit 11 at its input end for receiving the pixel clock signals and forming a multiphase clock signal which is sent to the clock signal input end of the differential signal input unit 11, wherein, the differential signal input unit 11 is also used to receive the serial video stream data and form the parallel video stream data based on the multiphase clock signal, and send it to the memory 30.

That is, in this embodiment, the differential signal input unit 11, i.e., the LVDS shown in FIG. 4, receives the pixel clock signal Pixel_clk sent from a front end video source and sends it to the locked loop MPLL, the MPLL generates a multiphase clock signal and sends it to the differential signal input unit 11. Under the control of the pixel clock signal Pixel_clk, the differential signal input unit 11 forms a video stream data signal comprising the parallel video stream data and sends it to the memory 30. The memory 30 receives the predetermined clock signal formed via the first locked loop 53, and outputs the differential output signal comprising the video stream data under the control of the signal via the differential output unit 55. It needs to be emphasized that the first locked loop 53 can completely output a clock with a spread spectrum characteristic for use by the differential output unit, so as to optimize the effect of EMI (Electro Magnetic Interference). Hence, from the structure of the timing controller shown in FIG. 4, the structure can realize all functions of the timing controller in existing clock-free transmission line and not change or weaken the advantages of the existing structures due to the optimization of the structures.

However, from the above analysis, on the basis of realizing all functions of the timing controller of the existing clock-free transmission line, the timing controller shown in FIG. 4 can also output the parallel video stream data at a constant output rate and ensure outputting the parallel video stream data at a stable output rate, which thus solves the problem in the prior art that the rate at which the timing controller outputs the video stream data is affected by input.

The present invention also provides a liquid crystal display using the timing controller shown in the above embodiments. The other structures of the liquid crystal display are the same with those of the displays in the prior art, and thus are omitted here.

From the above description, it is seen that the above embodiments of the present invention achieve the following technical effect:

the parallel video stream data outputted by the timing controller is controlled by the clock signal it generates, which solves the problem in the prior art that the rate at which the timing controller outputs the video stream data is affected by input. Also, as the outputted video stream data is controlled by the clock signal it generates, no matter how the input clock frequency changes, the output frequency is constant, which will also reduce the locking period of time of the timing controller to a certain extent, thereby solving the problem of long locking period of time of the timing controller in the prior art.

Described above are just preferable embodiments of the present invention and are not used to restrict the present invention. For one skilled in the art, the present invention may have various modifications and changes. Any modifications, equivalent substitutions, improvements, and etc. within the spirit and the principle of the present invention shall all be contained within the scope of protection of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A timing controller, comprising:
 a data converting module configured (10) for converting inputted serial video stream data into parallel video stream data; and
 a memory (30) configured for storing the parallel video stream data;
 and further comprising:
 an output module (50) connected with the memory (30) configured for generating a predetermined clock signal and outputting the parallel video stream data under the control of the predetermined clock signal, wherein, the data converting module (10) comprises:
a differential signal input unit (11) configured for receiving inputted pixel clock signals; and
a second phase locked loop (13) whose input end connected with the differential signal input unit (11) configured for receiving the pixel clock signals and forming a multiphase clock signal which is sent to the clock signal input end of the differential signal input unit (11),
wherein, the differential signal input unit (11) is also configured for receiving the serial video stream data and form the parallel video stream data based on the multiphase clock signal,
wherein, the output module (50) comprises:
a clock signal frequency providing circuit which configured for providing a frequency value of the predetermined clock signal;
a first phase locked loop (53) connected with the clock signal providing circuit configured for generating the predetermined clock signal according to the frequency value of the predetermined clock signal; and
a differential output unit (55) connected with the memory (30) and the first phase locked loop (53) configured for outputting a differential output signal comprising the parallel video stream data under the control of the predetermined clock signal,
wherein the first locked loop 53 output a clock with a spread spectrum characteristic for use by the differential output unit (55).

2. The timing controller according to claim 1, wherein, the output end of the first phase locked loop (53) is also connected to the memory (30) to provide the predetermined clock signal to the memory (30).

3. The timing controller according to claim 2, wherein, the clock signal frequency providing circuit comprises:
a reference frequency providing unit (511) connected with the first phase locked loop (53) configured for providing a reference clock signal frequency value to the first phase locked loop (53); and
a frequency generating unit (513) connected with the first phase locked loop (53) configured for providing the frequency value of the predetermined clock signal.

4. The timing controller according to claim 2, wherein, the data converting module (10) comprises:
a differential signal input unit (11) configured for receiving inputted pixel clock signals; and
a second phase locked loop (13) whose input end connected with the differential signal input unit (11) configured for receiving the pixel clock signals and forming a multiphase clock signal which is sent to the clock signal input end of the differential signal input unit (11),
wherein, the differential signal input unit (11) is also configured for receiving the serial video stream data and form the parallel video stream data based on the multiphase clock signal.

5. The timing controller according to claim 1, wherein, the clock signal frequency providing circuit comprises:
a reference frequency providing unit (511) connected with the first phase locked loop (53) configured for providing a reference clock signal frequency value to the first phase locked loop (53); and
a frequency generating unit (513) connected with the first phase locked loop (53) configured for providing the frequency value of the predetermined clock signal.

6. The timing controller according to claim 5, wherein, the frequency value tx_clk of the predetermined clock signal is calculated according to:

$$tx\_clk = k * osc\_clk,$$

wherein, k is a predetermined proportional coefficient value, and osc_clk is the reference clock signal frequency value.

7. The timing controller according to claim 1, wherein, the data converting module (10) comprises:
a differential signal input unit (11) configured for receiving inputted pixel clock signals; and
a second phase locked loop (13) whose input end connected with the differential signal input unit (11) configured for receiving the pixel clock signals and forming a multiphase clock signal which is sent to the clock signal input end of the differential signal input unit (11),
wherein, the differential signal input unit (11) is also configured for receiving the serial video stream data and form the parallel video stream data based on the multiphase clock signal.

8. The timing controller according to claim 1, characterized in that the differential signal input unit (11) is also configured for sending the multiphase clock signal to the memory (30).

9. A liquid crystal display, comprising the timing controller according to any one of claims 1.

* * * * *